US011898316B2

(12) United States Patent
Myllykoski

(10) Patent No.: US 11,898,316 B2
(45) Date of Patent: Feb. 13, 2024

(54) SEPARATING ARRANGEMENT FOR A DEVICE FOR COLLECTING WASTE FROM WATER AND A DEVICE

(71) Applicant: Clewat Oy, Kokkola (FI)

(72) Inventor: Johannes Myllykoski, Kokkola (FI)

( * ) Notice: Subject to any disclaimer, the term of this patent is extended or adjusted under 35 U.S.C. 154(b) by 55 days.

(21) Appl. No.: 17/427,630

(22) PCT Filed: Feb. 6, 2020

(86) PCT No.: PCT/FI2020/000004
§ 371 (c)(1),
(2) Date: Jul. 31, 2021

(87) PCT Pub. No.: WO2020/161381
PCT Pub. Date: Aug. 13, 2020

(65) Prior Publication Data
US 2022/0098812 A1     Mar. 31, 2022

(30) Foreign Application Priority Data
Feb. 8, 2019  (FI) ..................................... 20197020

(51) Int. Cl.
*E02B 15/10*     (2006.01)
*B01D 17/02*     (2006.01)
(Continued)

(52) U.S. Cl.
CPC ........ *E02B 15/104* (2013.01); *B01D 17/0214* (2013.01); *C02F 1/40* (2013.01); *E02B 15/045* (2013.01)

(58) Field of Classification Search
CPC ...... E02B 15/045; E02B 15/10; E02B 15/104; E02B 15/106; E02B 15/107;
(Continued)

(56) References Cited

U.S. PATENT DOCUMENTS

| 2,891,672 A | * | 6/1959 | Veld | ...................... E02B 15/106 |
| | | | | 210/242.3 |
| 3,578,171 A | * | 5/1971 | Usher | ................... E02B 15/106 |
| | | | | 210/776 |

(Continued)

FOREIGN PATENT DOCUMENTS

| CN | 104652376 A | 5/2015 |
| FR | 2804142 | 7/2001 |

(Continued)

OTHER PUBLICATIONS

Machine translation of JP 2000-6882 (Year: 2000).*

(Continued)

*Primary Examiner* — Joseph W Drodge
(74) *Attorney, Agent, or Firm* — BelayIP

(57) ABSTRACT

A separating arrangement for a device for collecting waste material floating on or near the surface of water is disclosed. The separating arrangement includes a first basin and a separating means. The water containing waste is led to the first basin by a transfer arrangement, such as a pipe. The device is configured in such a way that the water coming from the transfer arrangement has a speed gradient, namely, the cross section of the transfer arrangement has areas where the speeds of the water flow are different. The fastest speed component of the water has the highest concentration of waste. The first basin and the separating means are configured in such a way that when the water arrives at the first basin, most of the waste reaches the separating means and does not clog the walls of the first basin.

12 Claims, 2 Drawing Sheets

(51) Int. Cl.
*E02B 15/04* (2006.01)
*C02F 1/40* (2023.01)

(58) Field of Classification Search
CPC . B01D 17/0211; B01D 17/0214; B63B 35/32; Y02A 20/204; C02F 1/40; C02F 2103/007; C02F 2103/08
USPC ... 210/170.05, 170.09, 170.11, 242.1, 242.3, 210/747.6, 776, 923
See application file for complete search history.

(56) References Cited

U.S. PATENT DOCUMENTS

| | | | | |
|---|---|---|---|---|
| 3,637,080 A * | 1/1972 | Markel | ............... | E02B 15/104 210/776 |
| 3,700,108 A * | 10/1972 | Richards | ............... | E02B 15/104 210/242.3 |
| 3,708,070 A * | 1/1973 | Bell | ............... | E02B 15/046 210/242.3 |
| 3,726,406 A * | 4/1973 | Damberger | ............... | E02B 15/106 210/776 |
| 3,730,346 A * | 5/1973 | Prewitt | ............... | E02B 15/106 210/776 |
| 3,844,944 A | 10/1974 | Mercuri | | |
| 4,061,569 A | 12/1977 | Bennett et al. | | |
| 5,197,263 A * | 3/1993 | Midtling | ............... | A01D 44/00 210/242.3 |
| 5,292,433 A * | 3/1994 | Fletcher | ............... | E02B 15/106 405/60 |
| 6,326,888 B1 | 12/2001 | Wang | | |
| 6,375,835 B1 * | 4/2002 | Lee | ............... | C02F 1/40 210/242.3 |
| 7,022,223 B2 * | 4/2006 | Lovestead | ............... | E04H 4/1263 210/242.1 |
| 2012/0145614 A1 | 6/2012 | Torres | | |
| 2022/0010515 A1 * | 1/2022 | Myllykoski | ............... | E02B 15/106 |

FOREIGN PATENT DOCUMENTS

| | | | |
|---|---|---|---|
| JP | 2000-6882 | * | 1/2000 |
| KR | 20140101170 | | 8/2014 |

OTHER PUBLICATIONS

CN104652376 English Language Translation.
KR20140101170 English Language Translation.
FR2804142 English Language Translation.
CN104652376 English Language Translation, published 2015.
KR20140101170 English Language Translation, published 2014.
FR2804142 English Language Translation, published 2001.

* cited by examiner

SEPARATING ARRANGEMENT FOR A DEVICE FOR COLLECTING WASTE FROM WATER AND A DEVICE

CROSS REFERENCE TO RELATED APPLICATIONS

This application is a national phase application of International Application No.: PCT/FI2020/000004, filed Feb. 6, 2020, and further claims priority to Finnish Patent Application 20197020, filed Feb. 8, 2019, the contents of both of which are incorporated herein by reference.

BACKGROUND OF THE INVENTION

The present disclosure relates to a separating arrangement for a device for collecting oil, plastic or similar waste material floating on or near the surface of the sea or a similar large body of water, the separating arrangement further comprising a collector arrangement for collecting water and waste and a transfer arrangement for transferring the collected water and waste to the separating arrangement, and the separating arrangement comprising a first basin and a separating means, and the transfer arrangement is connected to the first basin, and the separating means is configured to separate at least a part of the waste from the water from the first basin. The present disclosure also relates to a device incorporating a separating arrangement.

It is now a well-known fact that plastic waste gathers at sea with many harmful consequences. Many systems are suggested for removing plastic and other forms of solid waste.

A known system for cleaning solid waste floating on water is that of a boat incorporating a submerged collection basket, so that as the boat travels forward, solid waste enters the basket, which is then lifted onto the boat at certain intervals and subsequently disposed of on land. This system features two basic drawbacks: one of them being the fact that the emptying of the basket has to be carried out manually, and due to its weight, the removal of the basket and its storage on the boat is problematic, all of which require substantial physical effort. On the other hand, the basket in question is equipped with a large orifice through which the solid waste enters the basket, but, likewise, due to the effect of the waves, such waste can exit the basket before it is collected, because, as mentioned before, the waste is only collected periodically.

Similarly, collecting oil or a similar liquid from the surface of water is problematic. A well-known system for cleaning oil spills at sea is a system comprising oil booms and a rotating brush. The booms guide and funnel the oil floating on the surface and the brush lifts the oil onto a collection vessel. However, the system is quite inefficient and in a worst case it breaks the oil slicks apart into small droplets (oil-water emulsion) which are themselves problematic to remove.

Patent publication U.S. Pat. No. 5,047,156 discloses an oil recovery vessel which has a multitude of oil separation tanks and a bow opening having an adjustable-height weir for skimming oil, debris, and other pollutants from the seawater for discharge into a separation tank. However, this system is quite cumbersome and difficult to adjust. Also, it is very difficult, if not impossible, to scale down.

There are many kinds of mechanical separating arrangements to separate water and the waste, liquid or solid. These arrangements usually comprise tanks and weirs and such structures that collect waste material. These structures have in common that the water must flow, and that the speed of the flow should be adjusted according to the kind of waste that the water contains and the amount of waste contained in the water. However, this flow is quite hard to control. Many arrangements first gather contaminated water from a large area using, for example, booms or spreading bars on the surface of the water, and this gathered water is cleaned using separating arrangements. Thus, the gathered water contains lot of waste, resulting in clogging or obstructions forming in the separating arrangement. The obstructions can stop the device and they have to be manually cleaned away. Also, the waste in the separating arrangement can stick to the walls of the separating arrangements before the waste is separated from the water, namely, the contaminated water is moved in the cleaning process.

There is a clear need for a waste-collection device for use in bodies of water such as at sea that collects all kinds of waste material floating on or near the surface, and which device does not easily clog.

BRIEF SUMMARY OF THE INVENTION

An object of the present disclosure is a solution that can significantly reduce the disadvantages and drawbacks of the prior art. In particular, an object of the present disclosure is a solution where a separating arrangement for a cleaning device is provided that can separate both solid and liquid waste and does not clog.

An invention set out in the present disclosure is a separating arrangement for a device for collecting waste material floating on or near the surface of water. The separating arrangement comprises a first basin and a separating means. The water containing waste is led to the first basin by a transfer arrangement such as, for example, a pipe. The device is configured in such a way that the water coming from the transfer arrangement has a speed gradient, namely, the cross section of the transfer arrangement has areas where the speeds of the water flow are different. The fastest speed component of the water has the highest concentration of waste. The first basin and the separating means are configured in such a way that when the water flows into the first basin, most of the waste reaches the separating means and does not clog against the walls of the first basin.

When reference is made in the text to the upper or the lower parts or respective directions such as down or up, a situation is described in which the device according to the invention is in use. Also, when reference is made to the vertical or horizontal directions or surfaces, the device is placed similarly.

In one embodiment of the present disclosure a separating arrangement for a device for collecting oil, plastic or similar waste material floating on or near the surface of the sea or a similar large body of water is set out, the device comprising a collector arrangement for collecting the water and waste and a transfer arrangement for transferring the collected water and waste to the separating arrangement, and the separating arrangement comprising a first basin and a separating means. The transfer arrangement is connected to the first basin, and the separating means is configured to separate at least a part of the waste from the water from the first basin. In one advantageous embodiment of the invention, the device is configured in such a way that the moving water in the transfer arrangement has a speed gradient, and the transfer arrangement has an opening in the first basin. The water flowing from the transfer arrangement into the first basin through the opening is directed to the separating means. The width of the first basin is at least three times the diameter of the opening or more so. The separating means has a first end and a second end, and the first end of the separating means is nearer to the opening than the second end of the separating means. The distance between the opening and the first end of the separating means is such that the fastest speed component of the water at the first end of the separating means is 50% or less than the fastest speed component of the water at the opening when the device is in use. A feature of the embodiments disclosed herein is having a speed gradient in the transfer arrangement concentrate the waste to the faster water flow. When the speed decreases at the first basin, the waste rises to the surface. Because the flow part containing the most waste is aimed towards the separating means, the amount of the waste clogging to the walls of the first basin is significantly reduced.

In one embodiment of the separating arrangement, the distance between the opening and the first end of the separating means is such that the fastest speed component of the water at the first end of the separating means is 10% to 50% of the fastest speed component of the water at the opening. The inventor has discovered that the speed of the water flow containing waste should not decrease too much.

In a second embodiment of the separating arrangement, the speed gradient of the water at the opening is such that the difference of the fastest speed component of the water and the slowest speed component of the water is 15% or more. The inventor has discovered that if the gradient is smaller, the concentration of waste disintegrates.

In a third embodiment of the separating arrangement, the first basin and the opening are configured in such a way that the upper edge of the opening is below the waterline of the first basin when the device is in use. This feature decreases the possibility of turbulence occurring near the opening.

In a fourth embodiment of the separating arrangement, the first basin and the opening are configured in such a way that the lower edge of the opening is at least half a diameter of the opening or more above the bottom of the first basin near the opening. A feature of this embodiment is that in some cases having the bottom nearer to the opening may cause the waste flow to curve down.

In a fifth embodiment of the separating arrangement, the bottom and the side walls of the first basin between the opening and the first end of the separating means are parallel to the direction of the fastest speed component of the water at the opening. This feature allows for smoother flow patterns, and thus improves the flow of waste towards the separating means.

In a sixth embodiment of the separating arrangement, the separating means comprises a conveyor belt arrangement for separating solid waste, and the conveyor belt arrangement is configured to move separated solid waste into one or more containers.

In a seventh embodiment of the separating arrangement, the conveyor belt arrangement comprises a first conveyor belt and a second conveyor belt, and the second conveyor belt is inside the first conveyor belt.

In an eight embodiment of the separating arrangement, the first conveyor belt and the second conveyor belt have holes, and the first conveyor belt is configured to carry waste particles with a minimum diameter of 1 cm and the second conveyor belt is configured to carry waste particles with a minimum diameter of 500 µm.

In a ninth embodiment of the separating arrangement, the conveyor belt arrangement comprises an air blower system, and the air blower system is configured to blow over the second conveyor belt, loosening the waste particles carried by the second conveyor belt. The conveyor belts have been found to be effective in catching solid waste particles. Naturally, they can be used for separating for liquid waste, too.

In a tenth embodiment of the separating arrangement, the separating means comprises an oil separation arrangement, and the oil separation arrangement comprises two or more weir arrangements for lifting oil off the surface of the water, and the weir arrangements are attached to the bottom of the separating arrangement and the weir arrangements are transverse to the direction of the water flow in the separating arrangement, and at least part of the weir arrangements are submerged when the device is in use, and the separating arrangement further comprises a second basin, and the second basin is configured to store the oil that the oil separation arrangement has separated.

In an eleventh embodiment of the separating arrangement, the inclinations of the weir arrangements or the distances of the upper edges of the weir arrangements from the surface of the water or both are adjustable according to the properties of the oil.

In a twelfth embodiment of the separating arrangement, the separating arrangement comprises a lifting arrangement for lifting the conveyor belt arrangement in such a way that the conveyor belt arrangement is above the water when the device is in use. This feature allows the device to be used to collect both liquid waste and solid waste. Also, it makes possible to collect both types of waste simultaneously.

In an embodiment of the invention set out in the present disclosure, a device for collecting oil, plastic or similar waste material floating on or near the surface of the sea or a similar large body of water is set out, the device further comprising a collector arrangement for collecting the water and waste, a separating arrangement and a transfer arrangement for transferring the collected water and waste to the separating arrangement. In one advantageous embodiment of the invention, the device has the separating arrangement that was described in the previous embodiments.

In an embodiment of the device, the transfer arrangement comprises a base pipe extending from under the collector arrangement to the opening, and the base pipe is straight and there is a pressure pipe for forcing a jet of water into the base pipe when the device is in use, and the direction of the jet of water is parallel to the longitudinal axis of the base pipe. This feature minimizes turbulence in the transfer arrangement.

It is an advantage of the disclosed invention that it provides a separating arrangement in which clogging of the collected waste is significantly reduced. Thus, a device employing such a separating arrangement is more efficient than known devices.

The presently disclosed invention also allows for a device that is easy to use and it is suitable for both solid and liquid waste collection and combination of both. It also produces a device that has no complex parts, so that it is easier to manufacture and maintain than devices according to known techniques.

An advantage of the invention is that it is quite efficient for collecting liquid waste and prevents mixing of water and liquid waste (emulsification process). The device can also be easily and quickly assembled and disassembled. The device is also suited for collecting both solid and liquid waste. Its construction allows it to be used in shallow water.

It is a further advantage of the invention that it can be easily optimized for different situations. Its scalability is good.

The presently disclosed invention also provides a device that does not easily clog. This means that it can be used in waters with an abundance of algae. Such waters have usually been very problematic to clean.

BRIEF DESCRIPTION OF THE SEVERAL VIEWS OF THE DRAWINGS

Further advantages features and details of the various embodiments of this disclosure will become apparatus from the ensuing description of a preferred exemplary embodiment or embodiments and further with the aid of the drawings. The features and combinations of features recited below in the description, as well as the features and feature combination shown after that in the drawing description or in the drawings alone, may be used not only in the particular combination recited but also in other combinations on their own without departing from the scope of the disclosure.

In the following, the invention is described in detail. The description refers to the accompanying drawings, in which.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination of A, B, and C.

The embodiments in the following description are given as examples only and someone skilled in the art can carry out the basic idea of the invention also in some other way than what is described in the description. Though the description may refer to a certain embodiment or embodiments in several places, this does not mean that the reference would be directed towards only one described embodiment or that the described characteristic would be usable only in one described embodiment. The individual characteristics of two or more embodiments may be combined and new embodiments of the invention may thus be provided.

Figure 1A:
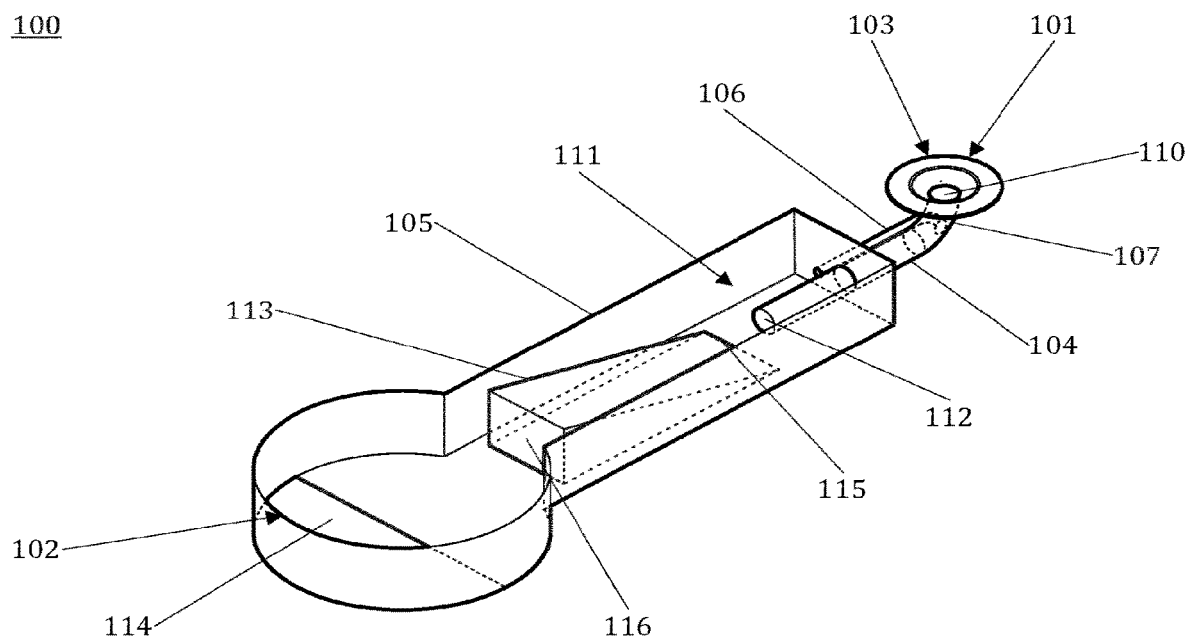
FIG. 1A depicts an example of a device according to an embodiment.
Figure 1B:
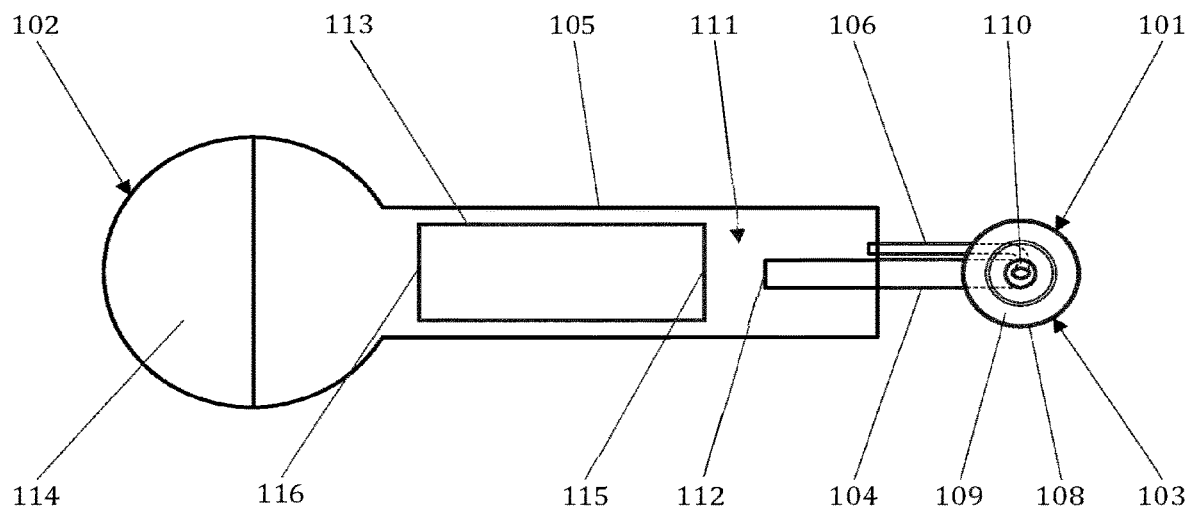
FIG. 1B depicts the device presented in FIG. 1A as seen from above.
Figure 1C:
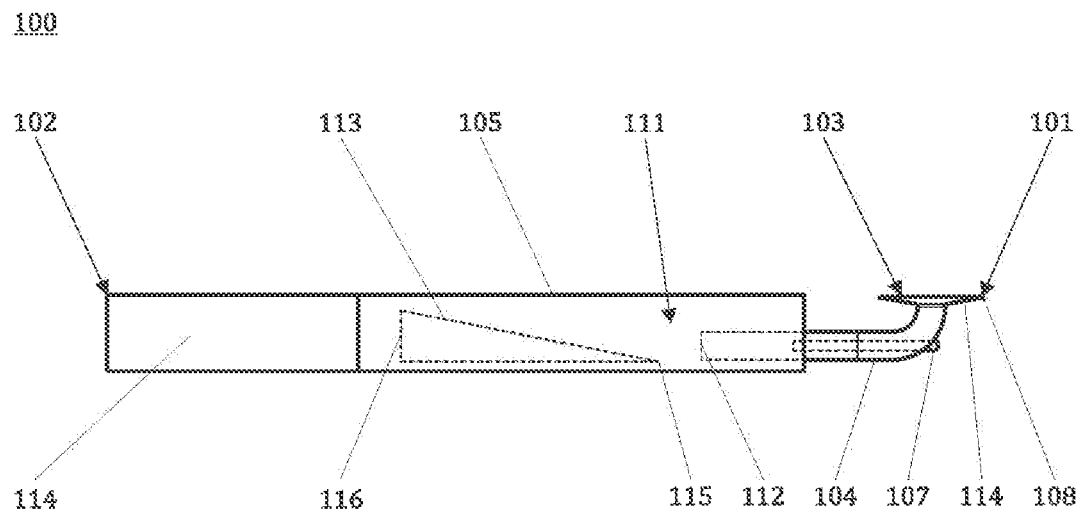
FIG. 1C depicts the device presented in FIG. 1A as seen from the side.

FIG. 1 shows an embodiment of a device 100 for collecting oil, plastic or similar waste material floating on or near the surface of the sea or a similar large body of water. FIG. 1A shows an overview of the device. FIG. 1B shows the device from above. FIG. 1C shows the device from the side. The construction of the device presented in these figures is simplified for sake of the clarity.

In this example, the device 100 is an elongated structure having a first end 101 and a second end 102. The device comprises a collector arrangement which is in this example a funnel structure 103 and a transfer arrangement which comprises in this example a base pipe 104. The device further comprises a separating arrangement 105, a pressure pipe 106 and a suction pipe 107. The funnel structure is at the first end of the device and the separating arrangement is at the second end of the device or at the middle part of the device. The funnel structure collects water and waste, and they are separated in the separating arrangement. The waste is stored, and the cleaned water is in most cases released back into the sea. The device is configured to be placed on a vessel or on two or more vessels, namely, the parts of the device can be implemented in separated places. For guiding waste containing surface water near the funnel structure, there can be booms or similar structures.

The separating arrangement 105 is designed to receive water containing waste from the base pipe 104. Furthermore, it is designed to receive water flow from the base pipe where there is a flow gradient, namely, the speed of the water is different at different distances from a longitudinal centre axis of the base pipe. Advantageously, the speed of the water in the middle of the base pipe 104 is greater than the speed of the water near the walls of the base pipe. Most of the waste is concentrated in the fastest speed component of the water, namely, in the middle of the base pipe. This is achieved by the design of the collector arrangement. In some embodiments there can be an arrangement for maintaining a steady flow of the water in the separating arrangement from the direction of the first end 101 of the device to the second end 102 of the device. This arrangement can be a pump or similar.

The separating arrangement 105 comprises a first basin 111, a separating means 113 and a second basin 114. The first basin has a side walls and a bottom. When the device 100 is in use, the first basin is at least partly filled with water. The separating means has a first end of the separating means 115 and a second end of the separating means 116. The first end of the separating means is towards the first end of the device 101 and the second end of the separating means is towards the second end of the device 102. The transfer arrangement, namely, the base pipe 104, has an opening 112 in the first basin 111. The first basin is filled with collected water and waste and the separating means is configured to separate the waste or most of it from the water. In one embodiment the first basin and the opening are configured in such a way that the upper edge of the opening is below the waterline of the first basin when the device is in use. The base pipe can extend into the first basin or the opening can be in the wall that is opposite to the first end of the separating means 115.

The water and the waste collected by the funnel structure 103 are ejected from the opening 112 to the first basin 111. The base pipe 104 and the opening are configured in such a way that the ejected water and waste is directed towards the first end of the separating means 115. The ejected water and waste combination decelerates when it reaches the first basin. The part of the water jet that contains concentrated waste decelerates slower than other parts of the water jet. Due to this, the waste reaches the first end of the separating means 115 and does not drift near the side walls of the first basin. This allows the separating means to receive most of the waste coming from the opening 112 directly. The distance between the opening and the first end of the separating means is such that the fastest speed component of the water at the first end of the separating means is 50% or less of the fastest speed component of the water at the opening. If the deceleration is not sufficient, the submerged waste particles aren't given enough time to rise upwards, and the efficiency of the separating arrangement 105 may not be optimal. This can be further optimized by adjusting the water pressure in the base pipe, namely, controlling the maximum speed or, in some embodiments, the base pipe 104 can be moved or adjusted in such a way that the distance between the opening and the first end of the separating means can be changed. These applicable changes depend on the properties of the waste, for example the amount and its composition, and on the speed flow gradients. In some embodiments, for adjusting the distance between the opening and the first end of the separating means, a base pipe moving arrangement is provided. There can be, for example, a telescopic arrangement in the part of the base pipe that is in the first basin for extending or shortening the distance between the opening and the separating means. Of course, the base pipe can have extension parts which can be attached or removed manually when the device 100 is prepared for use.

By way of experimentation the inventor has found that the flow gradient differences, namely, the speed differences of the slowest and the fastest flow components at the opening 112, should differ by at least 15% or more. If the speed differences are less than that, the probability of clogging increases because the waste is distributed to a greater degree.

In some embodiments the bottom and the side walls of the first basin 111 between the opening 112 and the first end of the separating means 115 are parallel to the direction of the fastest speed component of the water at the opening. This feature decreases the probability of clogging.

The separating means 113 can be arranged to separate solid or liquid wastes or both. For separating solid waste, the separating means can comprise a conveyor belt arrangement. The conveyor belt arrangement is configured to carry waste particles from the first basin 111 to one or more containers that are placed near the second end 102 of the device 100. For separating liquid waste, such as oil, the separating means comprises an oil separation arrangement. The oil separation arrangement comprises two or more weir arrangements for lifting oil off the surface of the water. The weir arrangements are plate-like constructs that are fixed to the bottom or the walls of the separating arrangement 105. The positions of the weir arrangements are adjustable. The weir arrangements guide oil to the surface of the water. The water and the oil drift towards the second end 102 of the device. The oil accumulates in the second basin 114 from where it can be removed. In some embodiments the conveyor belt arrangement can be lifted in such a way that the conveyor belt arrangement is above the water if the waste contains exclusively or mostly liquid such as oil. In some embodiments the conveyor belt arrangement is manufactured from or coated with a material that repels oil.

In some embodiments the conveyor belt arrangement comprises a first conveyor belt and a second conveyor belt, and the second conveyor belt is inside the first conveyor belt. The first conveyor belt and the second conveyor belt have holes, and the first conveyor belt is configured to carry waste particles with a minimum diameter of 1 cm and the second conveyor belt is configured to carry waste particles with a minimum diameter of 500 µm. This means that the minimum diameter of the holes in the first conveyor belt are 1 cm and in the second conveyor belt 500 µm. In other embodiments, the sizes of the holes can be different. In some embodiments the conveyor belt arrangement comprises an air blower system, and the air blower system is configured to blow over or through the second conveyor belt, loosening the waste particles carried by the second conveyor belt. Also, the air blower system can loosen oil from the conveyor belt or belts.

Some embodiments of an arrangement for producing a flow gradient (namely, a speed gradient) in the base pipe 104 for providing water-containing waste to the separating arrangement 105 are described in following.

At the first end 101 of the device 100 is the funnel structure 103 (namely, the collector arrangement). The funnel structure comprises a funnel edge 108, a funnel surface 109, a bottom 114 and a hole 110 at the bottom. The funnel structure as seen from above is a circular structure having a diameter of a funnel. The funnel surfaces slope towards the centre point of the funnel structure, namely, when the device is in use, the centre of the funnel structure goes further beneath the water surface than the funnel edge. The funnel structure is a downwardly narrowing cone. The bottom is the lowest part of the funnel structure. The hole is in the centre of the funnel at the bottom. The funnel edge is configured to be at least partly under the surface when the device is in use. In some embodiments, there are guidance arrangements or some such at the funnel edge. When the funnel edge is under water, water and the waste contained in it pass over the edges of the funnel structure and swirl towards the centre of the funnel and the hole situated there. In some embodiments, there are some collar structures around the edges of the funnel structure. These collar structures are configured to allow easy wave and water movement near the funnel edge 108.

In some embodiments, the slope of the funnel surface 109 is between 5 and 20 degrees from the horizontal plane. It has been found that if the slope is too gentle, the flow of the water into the funnel structure and into the hole 110 occurs too slowly, and the waste-gathering slows down, too. However, if the slope is too steep, the water flow may form a vortex above the hole 110 and the flow of the water and the waste through the hole into the suction pipe 107 may slow down.

The distance below the water surface of at least part of the funnel edge is between 2 and 10 cm when the device is in use. In some embodiments, the distance is constant. In some embodiments, the funnel structure 103 comprises an adjustment arrangement for adjusting the position of the funnel edge 108 in relation to the surface of the body of water when the device in in use.

The suction pipe 107 is vertical and it is connected to the hole 110 in such a way that water from the funnel structure can flow into the suction pipe. In some embodiments, the suction pipe is inclined towards the second end 103. The diameter of the hole is equal to the diameter of the suction pipe. The base pipe 104 leads to the separating arrangement 105. The base pipe is horizontal. The diameter of the base pipe is equal to the diameter of the suction pipe. In some embodiments, the variation of their diameters is less than 10%. The suction pipe is fixed to the base pipe in such a way that there is a curved wall below the hole. The curvature guides the water into the base pipe in a such way that turbulence is minimized.

To make the water flow stable, namely, to prevent a decline in the velocity of the water flow in the base pipe 104 and to control the properties of the water flow (for example, the amount, speed and turbulence), the pressure pipe 106 is configured to force a jet of water into the base pipe when the device is in use. The pressure pipe has an opening in the curved part of the wall, below the hole 110. In this embodiment the pressure pipe and the opening are configured in a such way that near the funnel structure the longitudinal axis of the jet of water at the opening and the longitudinal axis of the base pipe are convergent. This means that the jet of water is directed towards the centre of the base pipe. In some embodiments, the longitudinal axis of the jet of water at the opening and the longitudinal axis of the base pipe are congruent or parallel. It is essential that the jet of water is directed towards the base pipe, namely, the jet of water goes into the base pipe. The diameter of the pressure pipe is smaller than the diameter of the base pipe. In some embodiments, the diameter of the base pipe is two to five times greater than the diameter of the pressure pipe. The device 100 comprises an adjustable pump arrangement to control the pressure in the pressure pipe. The pump arrangement can be in the vessel in which the device is installed. It can also be in the separating arrangement 105. In some embodiments, if the device is configured to collect liquid waste or a combination of liquid and solid waste, the pressure that the pump arrangement produces in the pressure pipe is advantageously between 0.2 and 1.5 bar. The water jet-enhanced water flow in the base pipe prevents clogging by solid waste in the pipes. The speed of the jet of water coming from the opening of the pressure pipe is higher than the speed of the water coming from the suction pipe. This speed difference causes a flow gradient in the base pipe. The flow gradient has been found to have beneficial effects on the cleaning process. The separation process starts already in the base pipe and thus the overall efficiency of the device is improved. Also, the flow gradient can be adjusted in such a way that liquid waste does not form an emulsion with the water.

The pressure in the pressure pipe 106 is adjustable in order to optimize it for the size or composition or both of the waste material to be collected. In some embodiments the pressure in the pressure pipe is higher when the waste contains large objects (with a diameter greater than 2 cm) compared to a situation where the collected waste comprises mainly liquids or small objects (with a diameter less than 2 cm) or both. Also, if the water contains significant quantities of algae, the pressure may be increased. In some embodiments, there is a nozzle at the opening of the pressure pipe. The nozzle can be used for increasing the velocity of the jet of water. It has the same effect as increasing the pressure in the pressure pipe. The nozzle can also be used for directing the jet of water and reducing the diameter of the jet of water.

The jet of water from the pressure pipe 106 increases the suction in the suction pipe 107. It also increases the amount of water in the base pipe 104. Also, in many embodiments the speed of the jet of water is greater than the speed of the water coming from the suction pipe 107, and this speed difference provides a flow gradient in the base pipe 104. The inventor has found that having a flow gradient in the base pipe (or at least in first end 101 of the device 100) improves the separation of the waste (both in solid and liquid forms) from the water in the separating arrangement 105. By adjusting the jet of water, the water flow properties of the funnel structure can be adjusted and at the same time the waste-handling properties of the whole device 100. In some embodiments, the distance from the bottom 114 of the funnel to the upper surface of the base pipe, namely, the length of the suction pipe, is at least equal to or exceeds the radius of the base pipe. If the suction pipe is shorter, the water may in some cases start to flow upwards from the base pipe and the pressure pipe through the suction pipe.

In some embodiments, the diameter of the funnel is 2.5 to 5 times the diameters of the suction pipe and the base pipe. It has been determined that these relations are ideal for the flow properties of the funnel structure 103.

In some embodiments, the pressure pipe 106 has a curvature of 60 degrees or more underneath the funnel structure 103. The water in the pipe undergoes rotational movement inside the curvature. When the curvature is near the opening of the pressure pipe, the jet of water has a rotational velocity component. It has been determined that this improves the flow gradient in the base pipe in such a way that the efficiency of the device improves. This is especially evident when the waste to be removed contains both liquid and solid particles or when the solid waste contains particles of many sizes. In some embodiments, good results are achieved when the curvature is 80 to 100 degrees.

In some embodiments of the device 100, the pressure pipe 106 has a curvature of 180 degrees underneath the funnel structure, and some parts of the pressure pipe are parallel to the base pipe 104. This means that the pressure pipe comes from the direction of the separating arrangement 105. It has been determined that this improves the flow gradient in the base pipe in such a way that the efficiency of the device improves and also, the construction of the device is more compact. In some embodiments, the curvature in continuous. In some embodiments, the maximum radius of the curvature is four times the diameter of the pressure pipe. In this example, the pressure pipe is at the same level as the centre line of the base pipe.

The cleaned water can be released back into the sea. Some of it can be pumped back into the pressure pipe 106. The collected waste is stored on the vessel.

Figure 2:
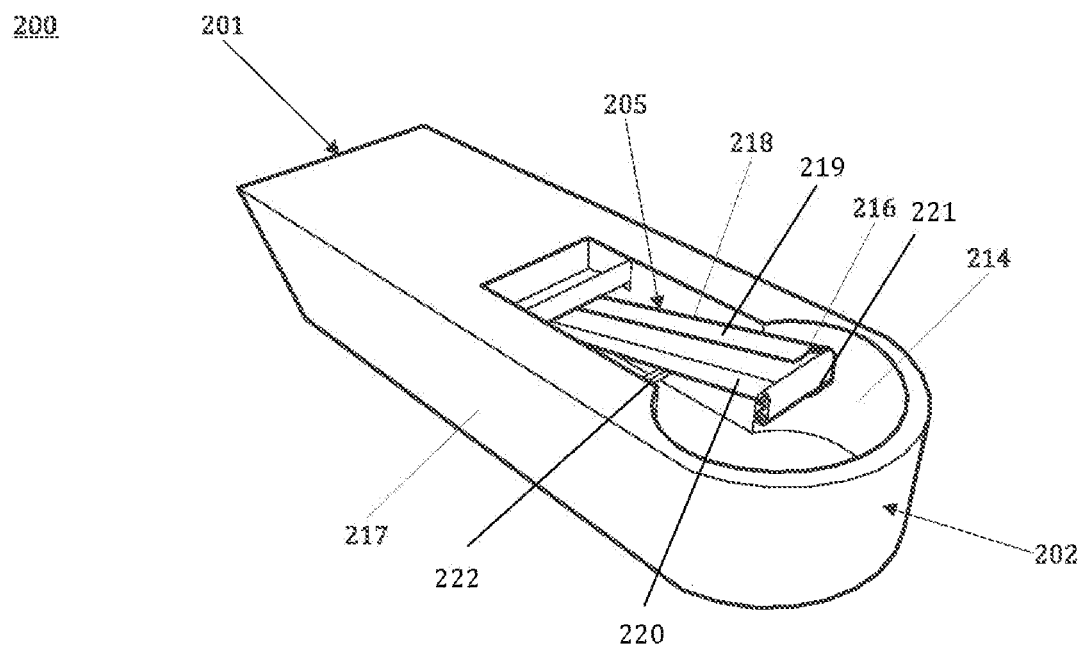
FIG. 2 depicts a second example of a device according to an embodiment.

FIG. 2 depicts a second embodiment of a device 200 for collecting waste material floating on or near the surface of the sea or a similar large body of water.

The device 200 is an elongated structure having a first end 201 and a second end 202. The device comprises a hull 217 that protects the inner structure of the device. The device further comprises a collector arrangement (inside the hull), a trans-fer arrangement (inside the hull) and a separating arrangement 205. The separating arrangement comprises a separating means 218, which has a first end (inside the hull) of the separating means and the second end 216 of the separating means. In this example, the separating means is a conveyor belt arrangement 218. The separating arrangement further comprises a first basin (inside the hull) where the gathered water and the waste are transferred by the transfer arrangement and a second basin where the collected waste is stored. The device is configured in such a way that the water (and waste) coming from the transfer arrangement has a transverse speed gradient, namely, in the cross-section of the transfer arrangement the water flows at different speeds depending on the distance from the center of the transfer arrangement. The fastest speed is found at or near the center area. In some embodiments the cross-section of the transfer arrangement is circular. As detailed above and depicted at least here in FIG. 2. The separating means comprises a first conveyer 219, a second conveyer 220, a blower 221 and weir arrangements 222.

Most of the waste can be found within the fastest water flow component when the water and waste reach the first basin. The waste proceeds towards the first end of the separating means, which is in this example the conveyor belt arrangement 218. The first end of the separating means is configured in such a way that the waste particles drift on the conveyor belt, which lifts them up and moves them towards the second end 216 of the separating means, where the conveyor belt deposits the waste particles into a container or the second basin 214.

Some advantageous embodiments of the device according to the invention have been described above. The invention is however not limited to the embodiments described above, but the inventive idea can be applied in numerous ways within the scope of the claims.

The invention claimed is:

1. A separating arrangement for a device for collecting liquid or solid waste material including oil or plastic waste material floating on or near a surface of a body of water, the separating arrangement comprising:

a first basin,
an opening arranged in the first basin,
a separating means,
a collector arrangement configured for collecting water and waste, and
a transfer arrangement configured for transferring the collected water and waste to the separating means, the transfer arrangement comprising a base pipe configured to extend from the collector arrangement to the opening and a pressure pipe for forcing a jet of water into the base pipe when the device is in use,
wherein the separating means is configured to separate at least a part of the waste from the water from the first basin,
wherein a width of the first basin is at least three times a diameter of the opening,
wherein the collector arrangement is a funnel comprising a hole in a bottom of the funnel,
wherein the transfer arrangement comprises a vertical suction pipe connected to the hole of the collector arrangement,
wherein the base pipe is connected to the suction pipe under the funnel, and the pressure pipe is configured to direct the jet of water towards a center of the base pipe in such a way that the moving water in the base pipe has a speed gradient and a direction of the jet of water is parallel to a longitudinal axis of the base pipe,
wherein the water coming from the transfer arrangement to the first basin from the opening is directed to the separating means, and
wherein the separating means has a first end and a second end, and the first end of the separating means is nearer to the opening than the second end of the separating means, and
the separating means comprises a conveyor belt arrangement, and the conveyor belt arrangement comprises a first conveyor belt and a second conveyor belt, and the second conveyor belt is inside the first conveyor belt.

2. The separating arrangement according to claim 1, wherein the transfer arrangement is configured such that a speed gradient of the water at the opening is such that the difference of a fastest speed component of the water and a slowest speed component of the water is 15% or more.

3. The separating arrangement according to claim 1, wherein the first basin is configured to be filled with collected water and waste, and the opening is configured such that an upper edge of the opening is below a waterline when the device is in use.

4. The separating arrangement according to claim 1, wherein the first basin and the opening are configured such that a lower edge of the opening is a distance of at least half the diameter of the opening above the bottom of the first basin near the opening.

5. The separating arrangement according to claim 1, wherein a bottom and side walls of the first basin between the opening and the first end of the separating means are arranged parallel to a direction of a fastest speed component of the water at the opening.

6. The separating arrangement according to claim 1, wherein the conveyor belt arrangement is configured to move separated solid waste material into one or more containers.

7. The separating arrangement according to claim 6, wherein the separating arrangement comprises a lifting arrangement for lifting the conveyor belt arrangement such that the conveyor belt arrangement is arranged above the water when the device is in use.

8. The separating arrangement according to claim 1, wherein the first conveyor belt and the second conveyor belt comprise holes, and the first conveyor belt is configured to carry waste particles of the solid material with a minimum diameter of 1 cm and the second conveyor belt is configured to carry waste particles of the solid material with a minimum diameter of 500 um.

9. The separating arrangement according to claim 8, wherein the conveyor belt arrangement comprises an air blower system configured to blow over the second conveyor belt so as to loosen waste particles carried by the second conveyor belt.

10. The separating arrangement according to claim 1, wherein:
the separating means comprises an oil separation arrangement having two or more plate-like weir arrangements configured for lifting oil off the surface of the water, attached to a bottom of the separation arrangement, and arranged transverse to a water flow direction in the separation arrangement,
at least part of the weir arrangements are arranged under water when the device is in use,
wherein the separating arrangement further comprises a second basin, and
the second basin is configured to store oil that the oil separation arrangement has separated.

11. The separating arrangement according to claim 10, wherein inclinations of the weir arrangements or distances of upper edges of the weir arrangements from the surface of the water, or both, are adjustable to suit properties of the oil.

12. The separating arrangement according to claim 1, wherein a distance between the opening and the first end of the separating means is such that a fastest speed component of the water at the first end of the separating means is 50% or less of a fastest speed component of the water at the opening when the device is in use.

* * * * *